MAGNETIC CORE MATRIX DECODER

Filed March 7, 1960

INVENTORS
ROBERT C. MINNICK
EDWIN S. LEE, III
BY Christie, Parker & Hale
ATTORNEYS 3,141,158
MAGNETIC CORE MATRIX DECODER Robert C. Minnick, Arcadia, and Edwin S. Lee III, San Gabriel, Calif., assignors to Burroughs Corporation, Detroit, Mich., a corporation of Michigan Filed Mar. 7, 1960, Ser. No. 13,194
8 Claims. (Cl. 340—347)

This invention relates to digital decoders and, more particularly, is concerned with a magnetic core matrix circuit for converting a binary code to a one-out-of-K code.

The use of matrix circuits is well known for converting from one code to another. For example, matrix circuits have been heretofore proposed which may be used to convert between a binary code and a decimal code. With the advent of the magnetic core random access memory, matrix decoders were developed for converting address information in the form of a binary coded word to select one or a group of a large number of readout lines in the magnetic core memory circuit. Such magnetic decoders are known in the art as memory access switches. Various memory access switches using magnetic cores have heretofore been proposed, but all these magnetic core matrix switches have required a number of cores at least equal to a number of output lines, i.e., the value of K in the one-out-of-K output code.

The present invention provides an improved magnetic core matrix switch which requires only as many cores as there are input binary bits. Since the number of output lines is equal to $2^N$, where N is the number of binary input bits, the savings in cores can be quite substantial. For example, if a six-bit binary input is provided to the decoder, sixty-four output lines are provided in the one-out-of-K output code. The circuit arrangement of the present invention requires only six cores in contrast to a minimum of sixty-four cores for such a decoder employed in known prior art matrix devices.

In brief, the magnetic core matrix switch of the present invention comprises a plurality of magnetic cores equal in number to the number of binary bits N on the input, there being one core for each binary bit. A plurality of output windings are wound on each core corresponding in number to the value K, each output winding of any one core being connected in series with a corresponding output winding on each of the other cores to form K series circuits, each including N output windings. Means is provided including input windings on each of the cores for reversing the direction of flux to drive the matrix, the direction of reversal depending on the value of the associated binary input bit. Thus, the voltage across the output winding of a given core has one of two polarities, depending upon the binary value of the input. The output windings in each of the series circuits are connected so that the voltages all add in one direction in response to a pattern of flux reversals in the cores which is different for each of the series circuits, whereby for a given pattern of input binary bits, only a particular one of the series circuits has a maximum voltage of one polarity across the series circuit. Circuit means associated with each of the series circuits senses this maximum voltage condition for producing a one-out-of-K output from the matrix.

For a more complete understanding of the invention, reference should be had to the accompanying drawings, wherein.

Figure 1:
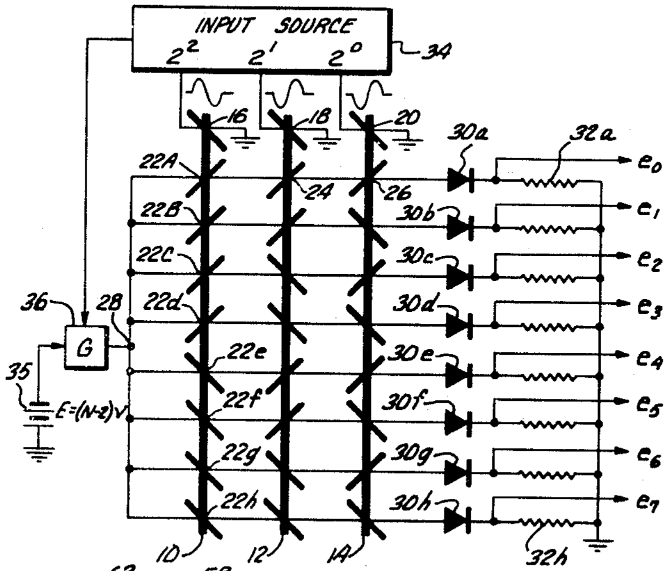
FIG. 1 is a schematic diagram of one embodiment of the present invention.

Referring to FIG. 1 in detail, a matrix circuit according to the present invention is shown which is arranged to convert from a three bit binary code to a one-out-of-8 code. However, it is to be understood that the principles of the invention can be extended to a larger number of input bits and a correspondingly increased number of outputs. The "mirror" scheme of notation has been used in the drawings to simplify and clarify the figures. Each magnetic core is represented by a heavy vertical black line, three cores being indicated respectively at 10, 12 and 14. Flux may be considered as extending either upwardly or downwardly along the length of the core. Each of the cores, in the embodiment shown in FIG. 1, is provided with a single input winding, indicated at 16, 18 and 20, respectively. A winding on the core is represented by a line crossing the core with a diagonal line through the intersection, the polarity of the winding being indicated by the direction of the diagonal line. The polarity of the winding is determined from the figures by considering the diagonal line as the edge of a mirror. A beam of light directed at the mirror in the direction of current flow in the winding is reflected by the mirror in the direction of the flux produced in the core by the current. If current flows toward ground in the input winding 16, it will be apparent from the convention used that flux is induced in the core 10 in a downwardly direction in FIG. 1.

Each of the magnetic cores is provided with a plurality of output windings, as indicated at 22_a–h_, 24_a–h_ and 26_a–h_, respectively. The rule for determining the polarity of an induced voltage in an output winding, according to the mirror convention, is that any resulting current flow must be in the direction which opposes flux change in the core. The mirror notation for core windings is well known and is described, for example, in the book Digital Computer Components and Circuits, by R. K. Richards, D. Van Nostrand Co., Inc., 1957, page 196.

The output windings are connected in a plurality of series circuits. In the embodiment shown in FIG. 1, the output winding of any one core is connected in series with a corresponding output winding on each of the other cores to form eight series circuits, each including three output windings.

One end of each of the series circuits is connected through a common terminal 28. At the other end, each of the series circuits is connected back to a common return through separate diodes 30_a–h_ and load resistors 32_a–h_. Separate output voltages, designated $e_0$, $e_1$, etc., are derived across each of the load resistors 32_a–h_. A voltage is developed across only one of the load resistors at a time, depending on the flux switching pattern induced in the cores 10, 12 and 14 by the input.

An input is applied through the input windings 16, 18 and 20, respectively, from a suitable input source of binary coded information indicated generally at 34. The output signal from the source 34 corresponding to the highest order bit is applied to the input winding 16 and the lowest order bit signal is applied to the input winding 20. The input source may be any device for generating parallel binary coded information and is arranged to pulse the input windings with bi-polar pulses, a binary zero being represented, for example, by a negative pulse followed by a positive pulse and a binary one being represented by a positive pulse followed by a negative pulse.

A potential source 35 provides a negative potential at the common terminal 28 of the series circuits through gate or relay switch 36. The potential is made equal to the peak potential of the output pulses multiplied by a factor of $N-2$, where N again is the number of binary input bits. In operation, the effect of the bi-polar pulses applied to the input winding is to insure that flux is always switched in the cores at the time of readout from the matrix. Flux may be switched in the cores by the first half of the bi-polar pulse, producing a spurious output from the matrix. For this reason, the gate 36 is provided which is controlled by the input source 34 such that the potential from the source 28 is applied to the series circuits only during the time of the second half of the bi-polar input pulses.

It will be apparent that during the second half of the bi-polar input pulses, flux is always switched in each of the cores, the direction in which it is being switched in a particular core depending upon whether the corresponding input is a binary one or a binary zero bit. As a result, a voltage is induced across each of the output windings associated with the respective cores, the polarity of the voltage with relation to the series circuits being determined by the polarity of the associated windings, as represented by the diagonal lines in FIG. 1. With three input bits and three associated cores, there are $2^3$ number of different flux switching combinations. The windings are arranged, as indicated in FIG. 1, such that in only one of the series circuits can a particular flux switching pattern in the three cores induce voltages across the windings of the series circuit that add together in one direction. Only in the series circuit in which the voltages add together in the right polarity is the associated diode forward-biased. All the other diodes are back-biased by the potential source 28. In this manner, a positive output pulse is produced across a particular one of the output load resistors according to the binary input.

Figure 2:
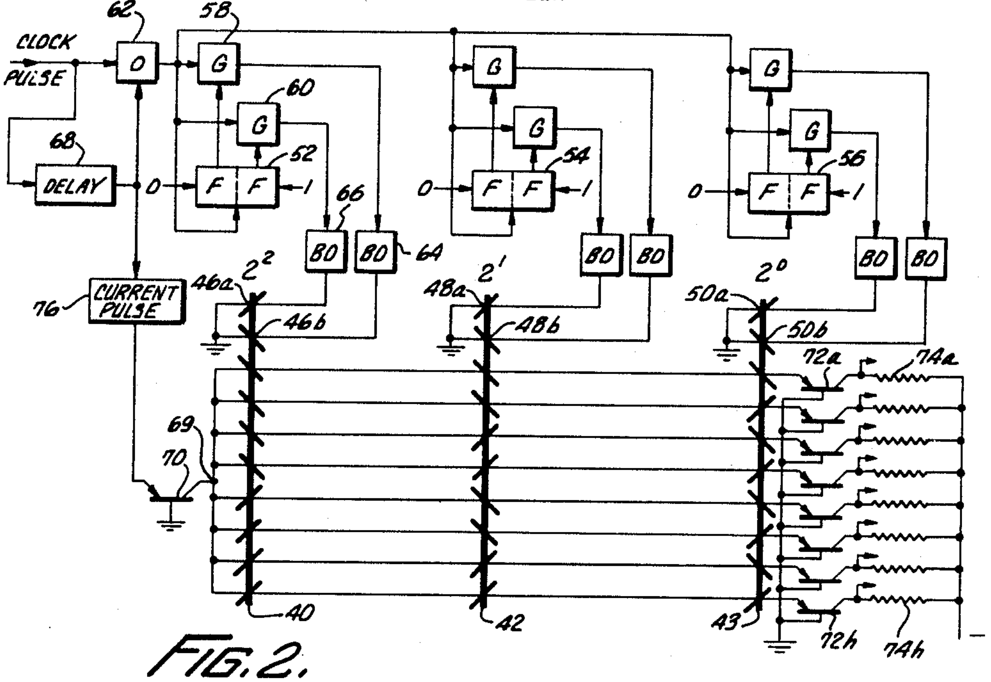
FIG. 2 is a schematic diagram of an alternative embodiment of the present invention.

In the alternative embodiment shown in FIG. 2, the core matrix circuit is similar to that shown in FIG. 1 in using a single core for each input bit. The means for setting the cores and for sensing the flux pattern in the cores is somewhat different. A plurality of cores corresponding to the number of binary input bits is provided, three being indicated at 40, 42 and 43. Each core is provided with a pair of input windings, indicated at 46*a*–*b*, 48*a*–*b* and 50*a*–*b*, respectively. The input windings are wound with opposite polarities and pulsed with pairs of current pulses in the same direction to produce flux reversals in the cores. One suitable arrangement for switching flux in the cores in response to binary input information is shown in which the binary information is stored in a register including three flip-flops indicated at 52, 54 and 56, numbered in the order from the most significant bit to the least significant bit of the binary input information. Each flip-flop controls a pair of gates, such as the gates indicated at 58 and 60 associated with the flip-flop 52. The gate 58 is biased open when the flip-flop 52 is in its binary zero condition and the gate 60 is biased open when the flip-flop is in its binary one condition. A pulse from a suitable clock pulse source is applied to the two gates through a logical "or" circuit 62 and is passed by one or the other of the gates 58 and 60 for actuating one or the other of a pair of blocking oscillators 64 and 66 for driving the respective input windings 46*a* and 46*b*. At the same time, the flip-flop 52 is complemented by the same clock pulse to its opposite stable state. To this end, the output of the logical "or" circuit 62 is applied to the complementing input of each of the flip-flops.

A clock pulse is also applied to the logical "or" circuit 62 through a delay circuit 68 so that a second pulse is applied to the gates 58 and 60 after the flip-flop has been complemented. This second pulse, operating through one or the other of the blocking oscillators 64 or 66, acts to reverse the flux in the core 40. The cores 42 and 44 are similarly controlled by the flip-flops 54 and 56. It will be apparent that at the time of the second or delayed pulse of the pulse pair used to control the cores, the flux is switched in the respective cores in a direction depending upon the binary bits stored in the flip-flop register.

The flux switching pattern of the cores is sensed by steering a current which is directed through one of a plurality of output circuits having the lowest impedance. To this end, the output windings of the respective cores are connected together in a group of series circuits, the number of series circuits corresponding to the number of windings in any one core. The polarities of the windings are coded in the same manner as the arrangement of FIG. 1, namely, the alternate output windings on the core 44 are reversed in polarity, alternate pairs of output windings on the core 42 are of opposite polarities, and alternate groups of four output windings are of opposite polarity on the core 40.

The series circuits are all connected to a common terminal 69, which in turn is connected to the collector electrode of a transistor 70, the base electrode of which is grounded. The transistor 70 is normally cut off so that the common terminal has a high impedance to ground. Each of the series circuits is connected back to a negative potential through respective ones of transistors 72*a*–*h* and load resistors 74*a*–*h*, there being a transistor and load resistor for each series circuit. Each of the series circuits is connected to the emitter of an associated one of the transistors 72*a*–*h*. Each of the load resistors 74*a*–*h* is connected to the collector of the associated one of the transistors 72*a*–*h*. The base electrodes of the transistors 72*a*–*h* are grounded. While transistors are shown in the arrangement of FIG. 2 in series with the load resistors, diodes could be used in the same manner as described in FIG. 1. Transistors have the advantage that they provide an amplification factor in the output signal derived across the respective load resistors and they isolate the load from the core windings.

When flux is switched in each of the cores, a voltage is induced across each of the output windings. The polarity of the voltage depends upon the polarity of the winding and the direction in which the flux is switched in the associated core. As described above in connection with FIG. 1, for a given pattern of flux change in the three cores, there is only one series circuit in which the polarities of the voltages across the output windings are in the same direction. As a result, there is only one of the transistors which has its emitter forward biased.

At the time the flux in the core is reversed by the second pulse of the pulse pair derived from the "or" circuit 62, a current pulse is applied to the emitter electrode of the transistor 70. This is derived from a current pulse source 76 which is triggered by the output of the delay circuit 68. Current pulse is, in effect, steered through the series circuit in which the associated transistor is forward biased by the action of the cores. Thus a signal may be derived across one of the load resistors 74*a*–*h*, depending on the binary bits stored in the input register.

What is claimed is:

1. A matrix circuit comprising a plurality of annular magnetic core elements, an input winding on each of the core elements, a plurality of output windings on each of the core elements, each output winding of one core element being connected in series with one output winding on each of the other core elements to form a plurality of series circuits, the number of windings in each series circuit being equal to the total number of core elements in said plurality of core elements, at least one of the windings in each series circuit being connected in opposite polarity from an output winding on the same core element in any one of the other series circuits, means coupled to the input windings for initially driving the flux in each of the core elements in one of the two possible directions around the core, means for simultaneously reversing the direction of flux in each of the core elements, the change in direction of the flux being indicative of binary input information, and means including a unidirectional current conductive device in each of said series circuits for producing an output signal from one of said series circuits in which the voltage polarities of the series connected output windings are all in the same direction.

2. Apparatus as defined in claim 1 wherein said means for producing an output signal includes a current pulse source, each of the series circuits being connected in parallel across the current pulse source, whereby the current pulse is directed through one of the series circuits in which the unidirectional conductive device is forward biased by the voltages induced in the output windings.

3. Apparatus as defined in claim 1 wherein said means for producing an output signal includes a potential source, each of the series circuits being connected in parallel across the potential source, the polarity of the potential source being such as to normally back-bias the unidirectional conductive devices, the potential being substantially equal $(N-2)V$, where N is the number of cores and V is the voltage induced across the output windings.

4. A matrix circuit for converting a binary code of N bits to a one-out-of-K code, where K is any digital value up to $2^N$, said matrix circuit comprising a plurality of magnetic cores equal in number to the number of binary bits N, there being one core for each binary bit, a plurality of output windings corresponding to the number K wound on each core, each output winding of any one core being connected in series with a corresponding output winding on each of the other cores to form K series circuits each including N output windings, means including input windings on each of the cores for simultaneously reversing the direction of flux in each of the cores, the direction of reversal depending on the value of the associated binary bit, whereby the voltage induced across each of the output windings associated with the cores has one of two polarities depending on the binary value of the input, the output windings in each of the series circuits being connected so that the induced voltages all add in one direction across a given series circuit in response to a particular pattern of flux reversals, which pattern is different for each of the series circuits, whereby for a given pattern of input binary bits only a particular one of the series circuits has a maximum voltage of one polarity across the series circuits, and means associated with each of the series circuits for sensing the maximum voltage condition.

5. Apparatus as defined in claim 4 wherein said means for sensing the maximum voltage condition across each of the series circuits includes, in each series circuit, a unidirectional conductive device and means for generating a signal in response to flow of current through said device.

6. Apparatus as defined in claim 5 wherein the series circuits are connected in parallel with each other across a potential source, the polarity of the potential being such as to normally back-bias the unidirectional conductive devices.

7. Apparatus as defined in claim 5 wherein the series circuits are connected in parallel with each other across a current pulse source, and further including means for pulsing the source simultaneously with the reversing of flux in the core elements, whereby the current pulse is passed through the series circuit in which the unidirectional conductive device is forward biased by the voltage induced across the associated output windings.

8. A matrix circuit comprising a plurality of magnetic core elements, an input winding on each of the core elements, a plurality of output windings on each of the core elements, each output winding of one core element being connected in series with one output winding on each of the other core elements to form a plurality of series circuits, the number of windings in each series circuit being equal to the total number of core elements in said plurality of core elements, at least one of the windings in each series circuit being connected in opposite polarity from an output winding on the same core element in any one of the other series circuits, means coupled to the input windings for simultaneously switching flux in all of the respective cores in a direction indicative of binary input information, and means for producing an output signal from one of said series circuits in which the voltage polarities produced across the series connected output windings by the switching of flux in the cores are all in the same direction.

References Cited in the file of this patent

UNITED STATES PATENTS

| | | |
|---|---|---|
| 2,846,671 | Yetter | Aug. 5, 1958 |
| 2,905,934 | Flint | Sept. 22, 1959 |